(12) United States Patent
Mandal et al.

(10) Patent No.: US 8,712,972 B2
(45) Date of Patent: Apr. 29, 2014

(54) QUERY OPTIMIZATION WITH AWARENESS OF LIMITED RESOURCE USAGE

(75) Inventors: Prateem Mandal, Magarpatta (IN); Edwin Anthony Seputis, Oakland, CA (US)

(73) Assignee: Sybase, Inc., Dublin, CA (US)

( * ) Notice: Subject to any disclaimer, the term of this patent is extended or adjusted under 35 U.S.C. 154(b) by 558 days.

(21) Appl. No.: 12/564,608

(22) Filed: Sep. 22, 2009

(65) Prior Publication Data

US 2011/0072008 A1   Mar. 24, 2011

(51) Int. Cl.
  *G06F 7/00* (2006.01)
  *G06F 17/00* (2006.01)
  *G06F 17/30* (2006.01)

(52) U.S. Cl.
  USPC .................. 707/686; 707/714; 707/718

(58) Field of Classification Search
  USPC ................. 707/713, 718, 813; 709/223
  See application file for complete search history.

(56) References Cited

U.S. PATENT DOCUMENTS

| | | | |
|---|---|---|---|
| 6,763,359 B2* | 7/2004 | Lohman et al. | 707/718 |
| 7,035,919 B1* | 4/2006 | Lee et al. | 709/223 |
| 7,251,657 B2* | 7/2007 | Saha et al. | 1/1 |
| 7,860,906 B2* | 12/2010 | Stephens et al. | 707/813 |
| 2009/0018992 A1* | 1/2009 | Zuzarte et al. | 707/2 |
| 2009/0106306 A1* | 4/2009 | Das et al. | 707/103 R |
| 2010/0306188 A1* | 12/2010 | Cunningham et al. | 707/713 |

* cited by examiner

*Primary Examiner* — Susan Chen
(74) *Attorney, Agent, or Firm* — Sterne, Kessler, Goldstein & Fox P.L.L.C.

(57) ABSTRACT

System, method, computer program product embodiments and combinations and sub-combinations thereof for tuning query execution performance in a database management system are described. In an aspect, query optimization in a database management system (DBMS) with awareness of limited resource usage includes identifying limited resource usage for each possible plan being considered for query execution by a query engine. A determination of whether any possible plan has limited resource usage that does not exceed a threshold level is made, and when at least one possible plan does not exceed the threshold level, the identified limited resource usage is included as a consideration during plan selection by the query engine. In an embodiment, temporary database usage is identified for each possible plan.

12 Claims, 8 Drawing Sheets

QUERY OPTIMIZATION WITH AWARENESS OF LIMITED RESOURCE USAGE

BACKGROUND

1. Field of the Invention

The present invention is directed to tuning query execution performance of a database system through query optimization with awareness of temporary database usage.

2. Background Art

Computers are very powerful tools for storing and providing access to vast amounts of information. Databases are a common mechanism for storing information on computer systems while providing easy access to users. A typical relational database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details.

One purpose of a database system is to answer queries requesting information from the database. A query may be defined as a logical expression over the data and the data relationships set forth in the database, and execution of a query results in the identification of a subset of the database. In operation, for instance, the execution of a request for information from a relational DBMS is typically issued by a client system as one or more Structured Query Language or "SQL" queries for retrieving particular data (e.g., a list of all employees earning more than $25,000) from database tables on a server. In response to this request, the database system typically returns the names of those employees earning $25,000, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component of the DBMS called the optimizer determines the "plan" or the best method of accessing the data to implement the SQL query. The query optimizer is responsible for transforming a SQL request into an access plan composed of specific implementations of the algebraic operator selection, projection, join, and so forth. The role of a query optimizer in a relational DBMS system is to find an adequate execution plan from a search space of many semantically equivalent alternatives. An example of a learning optimizer is described in U.S. Pat. No. 6,763,359, which provides an approach for selection of a query execution plan that utilizes statistics collected during query execution that are fed back to an optimizer to allow it to learn of a modeling mistake in a query execution plan.

During typical query optimization, the optimizer chooses a plan which is estimated to be least costly. A so-called cheapest plan that the optimizer selects may fail to produce the desired result when the resources needed to run the plan are not available, e.g., when overuse of a limited resource causes starvation of that resource for other query plans. Temporary database (tempdb) storage is one type of limited resource.

In general, the tempdb storage provides a temporary workspace that is relied upon by database applications for storing intermediate results and data that does not need to be persistent. In determining least cost, generally, an optimizer assumes that there is an unlimited amount of tempdb and tries to come up with a plan that is cheapest within that scenario. However, when the system doesn't have the required amount of tempdb needed for a plan, the optimized final plan may not be executable in the system. While the aforementioned U.S. Pat. No. 6,763,359 generally points out that configuration parameters, such as buffer pool size, can be made self-tuning in response to a detected lack of a resource for certain queries, it fails to provide a manner of determining the necessary information to perform such tuning nor does it provide an approach for evaluating and utilizing limited resource usage data, including tempdb usage, that would allow awareness and consideration by the optimizer during plan selection.

Accordingly, a need exists for an ability to provide awareness of limited resource usage, including tempdb usage, for query optimization. The present invention provides a solution for this and other needs.

BRIEF SUMMARY

Briefly stated, the invention includes system, method, computer program product embodiments and combinations and sub-combinations thereof for tuning query execution performance in a database management system. In an aspect, query optimization in a database management system (DBMS) with awareness of limited resource usage includes identifying limited resource usage for each possible plan being considered for query execution by a query engine. A determination of whether any possible plan has limited resource usage that does not exceed a threshold level is made, and when at least one possible plan does not exceed the threshold level, the identified limited resource usage is included as a consideration during plan selection by the query engine. In an embodiment, temporary database usage is identified for each possible plan.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for tuning query execution performance of a database system.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
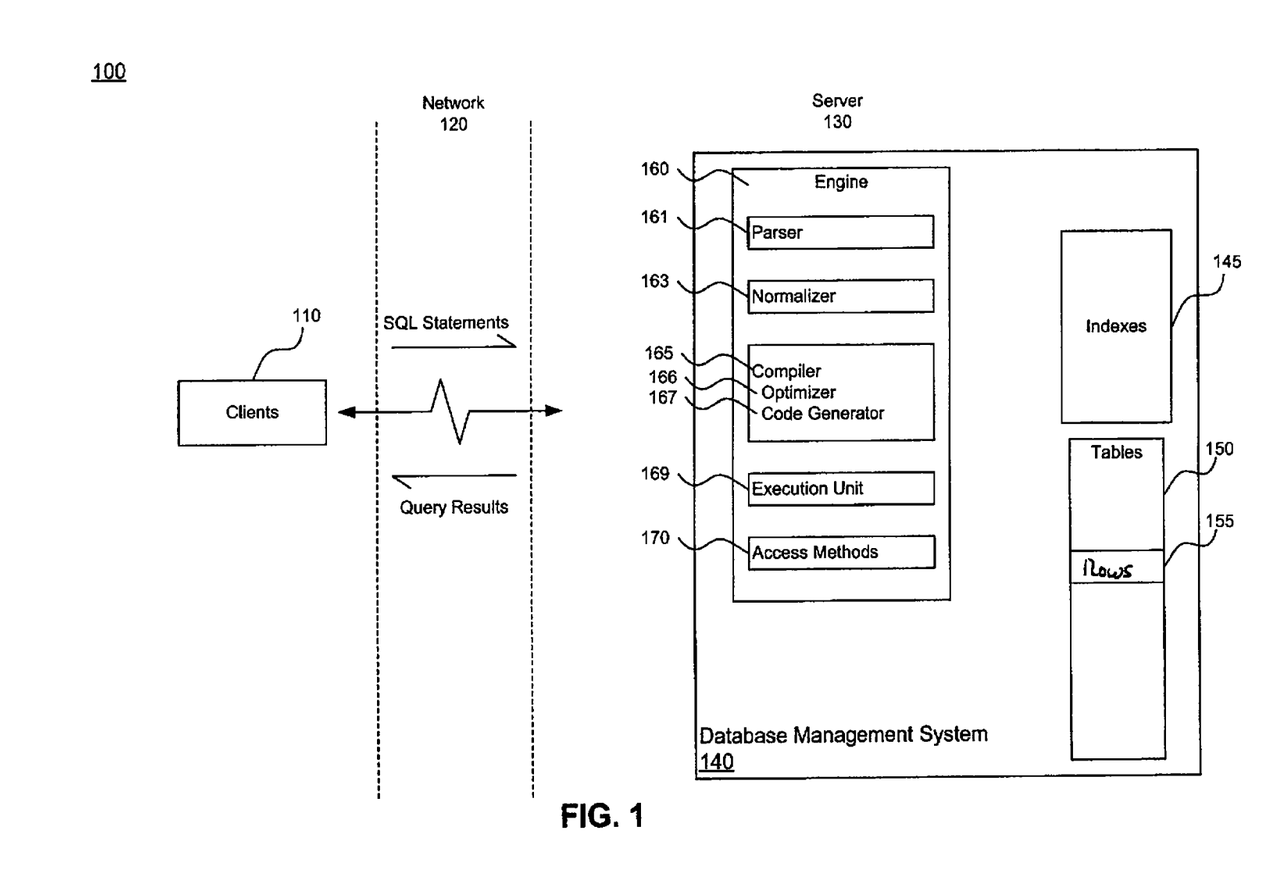
FIG. 1 illustrates an exemplary database management system (DBMS), according to an embodiment of the invention.

Embodiments of the invention may operate in the example client/server database system 100 shown in FIG. 1. System 100 includes one or more clients 110 in communication with a server 130 via a network 120. A database management system (DBMS) 140 resides in the server 130. It is noted that the example client/server database system 100 is shown in FIG. 1 and discussed herein solely for purposes of illustration, and not limitation. The invention is not limited to the example of FIG. 1.

In operation, clients 110 store data in, or retrieve data from, rows 155 of database tables 150 by issuing SQL statements to DBMS 140. Generally, data in a relational database is stored as a series of tables, also called relations. Typically resident on the server 130, each table itself comprises one or more "rows" or "records" (tuples). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of SQL. SQL statements may be divided into two categories: data manipulation language (DML), used to read and write data; and data definition language (DDL), used to describe data and maintain the database. DML statements are also called queries. In operation, for example, the clients 110 issue one or more SQL commands to the server 130. SQL commands may specify, for instance, a query for retrieving particular data (i.e., data records meeting the query condition) from the database table(s) 150. In addition to retrieving the data from database server table(s) 150, the clients 110 also have the ability to issue commands to insert new rows of data records into the table(s), or to update and/or delete existing records in the table(s).

SQL statements received from clients 110 are processed by query engine 160 of the DBMS 140. In an embodiment, query engine 160 comprises parser 161, normalizer 163, compiler 165, query optimizer 166, code generator 167, execution unit 169 and access methods 170, which shall now be generally described.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant data. Additionally, the normalizer 163 may perform error checking, such as confirming that table names and column names which appear in the query are valid (e.g., are available and belong together). Finally, the normalizer 163 may also look up any referential integrity constraints which exist and add those to the query.

After normalization, the query tree is passed to the compiler 165, which includes query optimizer 166 and a code generator 167. Query optimizer 166 is responsible for optimizing the query tree. A general goal of a query optimizer is to speed up the process of executing a query and returning the results. In an embodiment, query optimizer 166 performs a cost-based analysis for formulating a query execution plan. Query optimizer 166 will, for example, select the join order of tables, and select relevant indexes when available. Query optimizer 166, therefore, performs an analysis of the query and determines the best execution plan, from a plurality of generated execution plans, and where "best" is judged according to any defined criteria, which in turn results in particular access methods 170 being invoked during query execution by the execution unit 169.

Generally, during query optimization, the optimizer 166 chooses a plan which is estimated to be least costly. A so-called cheapest plan that the optimizer 166 selects may fail to produce the desired result when the resources needed to run the plan are not available, e.g., when overuse of a limited resource causes starvation of that resource for other query plans. In the subsequent description, an approach to query optimization that is aware of limited resource usage is described with particular details illustrating the approach for tempdb usage as the limited resource under consideration. However, this is meant as illustrative and not restrictive of the limited resource usage to which the aspects of the invention may be applied. Other examples of limited resources include worker threads for parallelism, or network traffic for distributed query processing (DQP). When considering other types of limited resources, the same general approach is applicable, although some differences can be recognized related to measuring the amount of resource usage based on the particular resource's usage model, as is well appreciated by those skilled in the art.

Figure 2A:
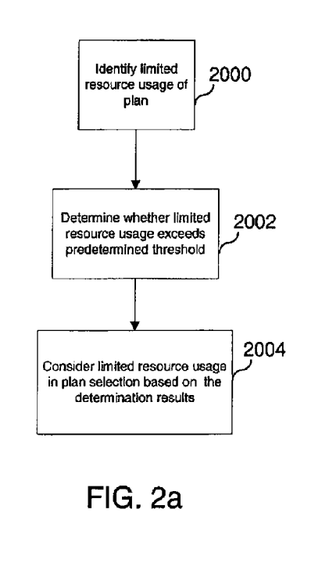
FIG. 2a depicts a block flow diagram of query optimization with awareness of limited resource usage in accordance with an embodiment of the invention.
Figure 2B:
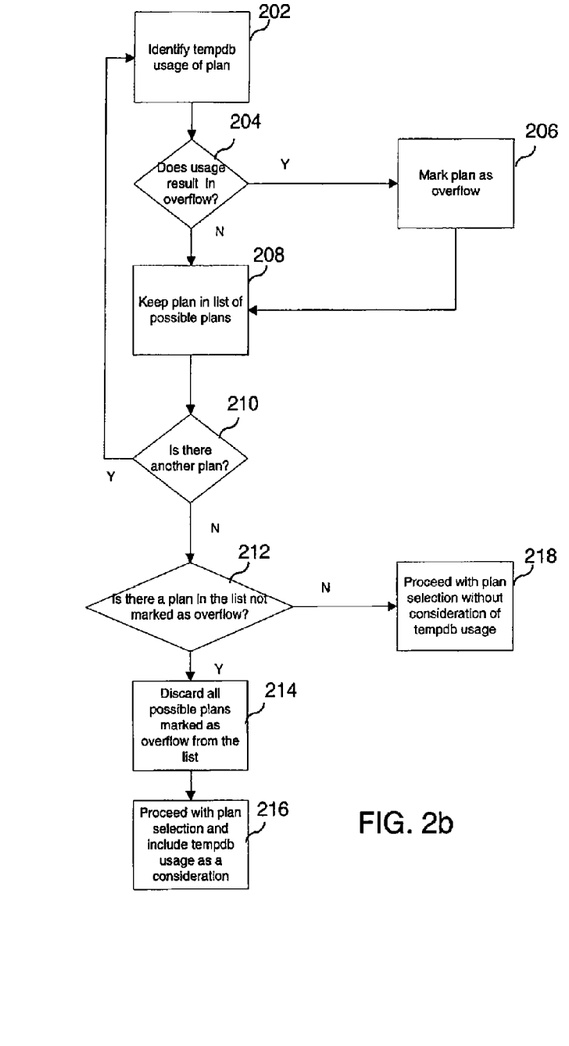
FIG. 2b depicts a block diagram of query optimization with awareness of tempdb usage in accordance with an embodiment of the invention.

FIG. 2a depicts a block flow diagram of query optimization with awareness of limited resource usage in accordance with an embodiment of the invention, and FIG. 2b depicts a block diagram of query optimization with awareness of tempdb usage in accordance with an embodiment of the invention.

Referring to FIG. 2a, query optimization with awareness of limited resource usage includes identifying limited resource usage for each possible plan being considered for query execution by a query engine 160 (block 2000). A determination of whether any possible plan has limited resource usage that does not exceed a threshold level is made (block 2002), and as a result, the manner of considering the limited resources usage by the query engine 160 is determined (block 2004), such that when at least one possible plan does not exceed the threshold level, the identified limited resource usage is included as a consideration during plan selection by the query engine 160. Otherwise, the identified limited resource usage is not included as a consideration during plan selection.

In operation, DBMS 140 has a certain amount of memory at the server 130 available for its use. All data in a typical relational database system is stored in pages on a secondary storage device, usually a hard disk. Typically, these pages may range in size from 1 Kb (kilobyte) to 32 Kb, with the most common page sizes being 2 Kb and 4 Kb. All input/output operations (I/O) against secondary storage are done in page-sized units—that is, the entire page is read/written at once. The memory in which pages that have been read from disk reside is called the cache or buffer pool.

Typically, during configuration of this system, the DBA (database administrator) user indicates how much memory is available for DBMS 140 use. Included in the memory of the DBMS is temporary database (tempdb) storage that provides a temporary workspace that is relied upon by database applications for storing intermediate results and data that does not need to be persistent. Heavy usage of tempdb storage due to query processing activities can degrade performance due to contention on tempdb system catalogs as well as the tempdb log, as is well understood in the art.

In order to account for possible performance degradation due to tempdb usage, the embodiments of the invention determine tempdb usage, which provides the optimizer 166 with better awareness of tempdb usage costs of possible plans under selection.

FIG. 2b depicts a block flow diagram of query optimization with awareness of tempdb usage in accordance with an embodiment of the invention. The process initiates as plan selection ensues by the query optimizer 166. For a plan under consideration, the tempdb usage of the plan is determined (block 202). Usage of tempdb in a given plan varies over time. In determining tempdb usage, the available tempdb is considered. Available tempdb refers to the maximum amount of tempdb usage to which the system tries to restrict a connection for execution of a given query and defines a tempdb budget that the optimizer 166 tries to constrain each plan to. It is calculated as a percentage of the total size of the temporary database assigned to the connection. The percentage is determined by the resource granularity, which is configurable, and in an example embodiment is 10%.

Given that the tempdb usage of a plan fluctuates during its lifetime of execution, if at any point in execution the tempdb requirement is more than the available tempdb, the plan will fail to execute. Therefore, the interesting quantity is the maximum tempdb usage of a plan during its entire lifetime. The tempdb used by a node (operator) in a plan is of two types. One type, which stores intermediate results that might be useful to other nodes, is referred to as steady state, and the other type, which stores temporary data used for computation by that node and is of no interest to other nodes, is referred to as transient. The calculation of tempdb usage by a plan in an embodiment is done in a bottom-up approach, such that at every node in the plan, the tempdb usage is defined by the steady state tempdb occupied by all the nodes in the subplan rooted at that node and the additional transient tempdb used by the node for temporary use. If the tempdb usage thus calculated at a node is more than the available tempdb, it is marked as an overflow node, e.g., via a flag bit. If a child of a node is marked as overflow, then the node is also marked as overflow. A plan is called an overflow plan, i.e. it is considered to use more tempdb than available, if its root node is marked as overflow node.

Figure 3A:
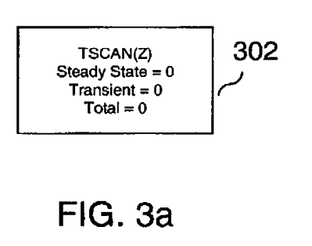
FIGS. 3a-3g illustrate an example of tempdb usage determination of a plan in a bottom-up approach according to an embodiment of the invention.
Figure 3B:
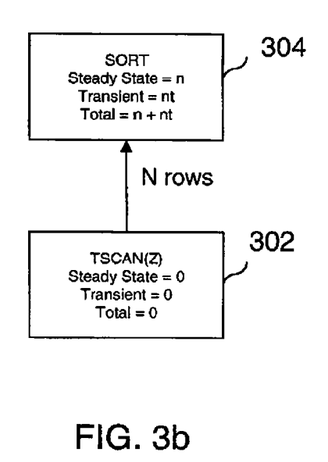

By way of example, FIGS. 3a-3g illustrate tempdb usage determination of a sample plan in a bottom-up approach. Referring to FIG. 3a, a first node of the sample plan includes a table scan 302 of a table 'Z' (TSCAN (Z)), which requires no tempdb usage. Thus, the total tempdb usage at the first level is zero. Continuing to a next higher level of the sample plan, as shown in FIG. 3b, performing a sort 304 on the N rows input from the table scan 302 requires a steady state tempdb usage of 'n' and a transient usage of 'nt', so the total usage is 'n+nt' at this level (where 'n' refers to the total of the rowsize*N rows).

Figure 3C:
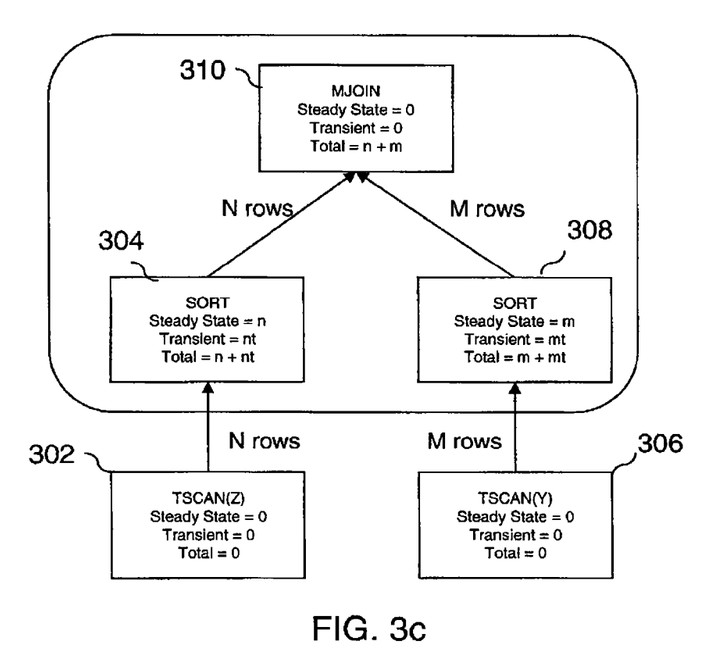
Figure 3D:
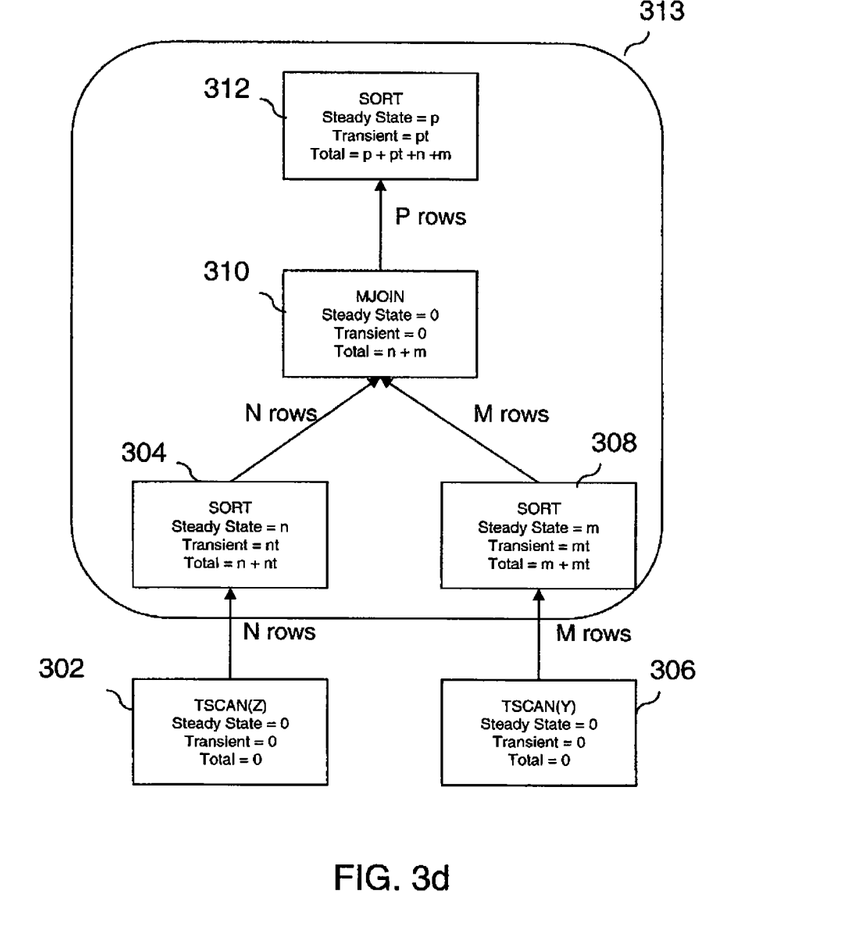

Subsequently, a similar, additional table scan 306 of a table 'Y' (TSCAN(Y)) and a sort 308 on top of TSCAN (Y) is performed, as shown in FIG. 3c. With a merge join 310 of the two sort nodes 304 and 308, the merge join 310 has no tempdb usage of its own. The interesting nodes for consideration are the child nodes, sort 304 and sort 308, such that a total tempdb for the merge join 310 is the steady state tempdb consumption, 'n+m', from the child nodes 304 and 308. Continuing to FIG. 3d, for a next level up due to a sort 312 on top of the merge join 310, the interesting nodes (indicated by enclosure in box 313) still include the first descendent sort nodes 304 and 308. The total tempdb usage is 'p+pt+n+m', reflecting the steady state use of the sort nodes 304, 308, and 312, and the transient usage of the top-most node, sort 312.

Figure 3E:
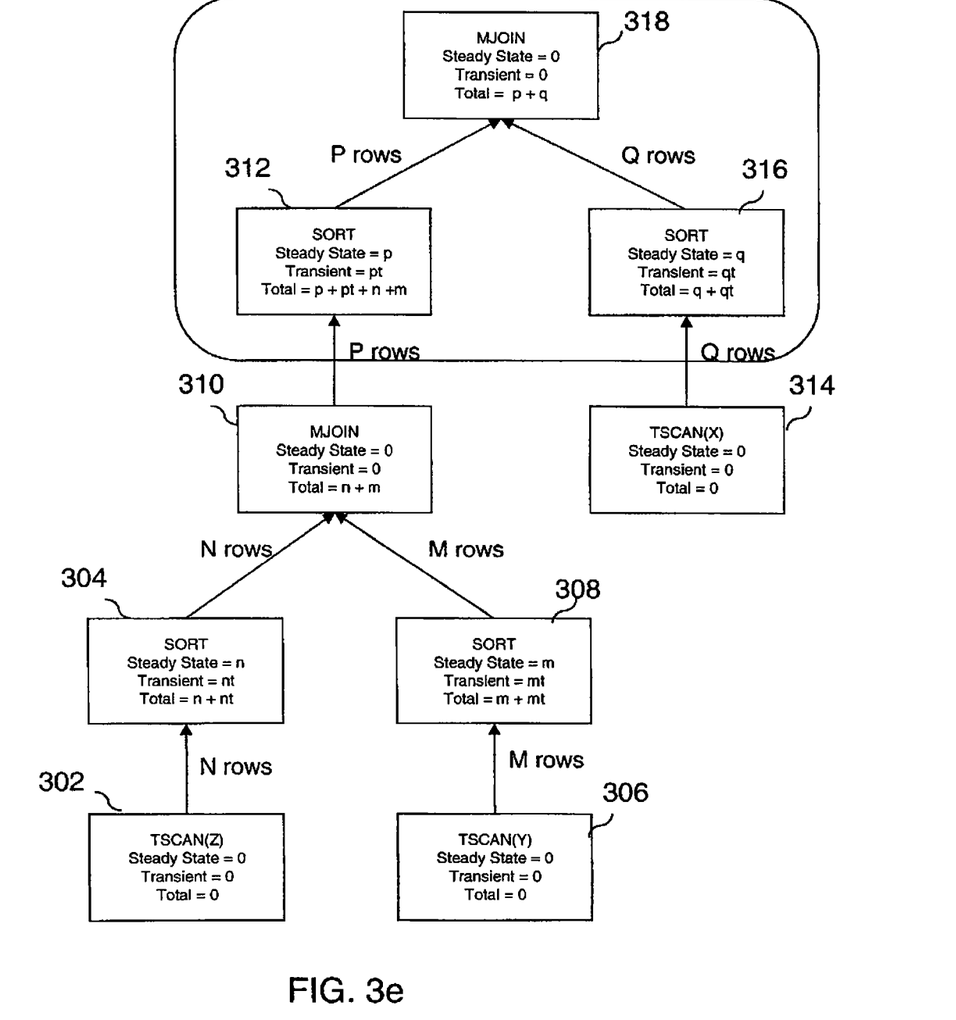

Referring to FIG. 3e, a continuation of the sample plan includes a merge join 318 on top of two sorted streams, one stream from the merge join 310 and another from a sort 316 on top of a table scan 314 of a table 'X'. The interesting nodes include the child sort nodes 312 and 316. As is well understood in the art, nodes 312 and 316 already have the data of the nodes beneath them present, with any tempdb usage by the lower nodes released by this point in the execution. Thus, the total tempdb usage at the merge join node 318 is the steady state consumption, 'p+q', by the child sort nodes 312 and 316.

Figure 3F:
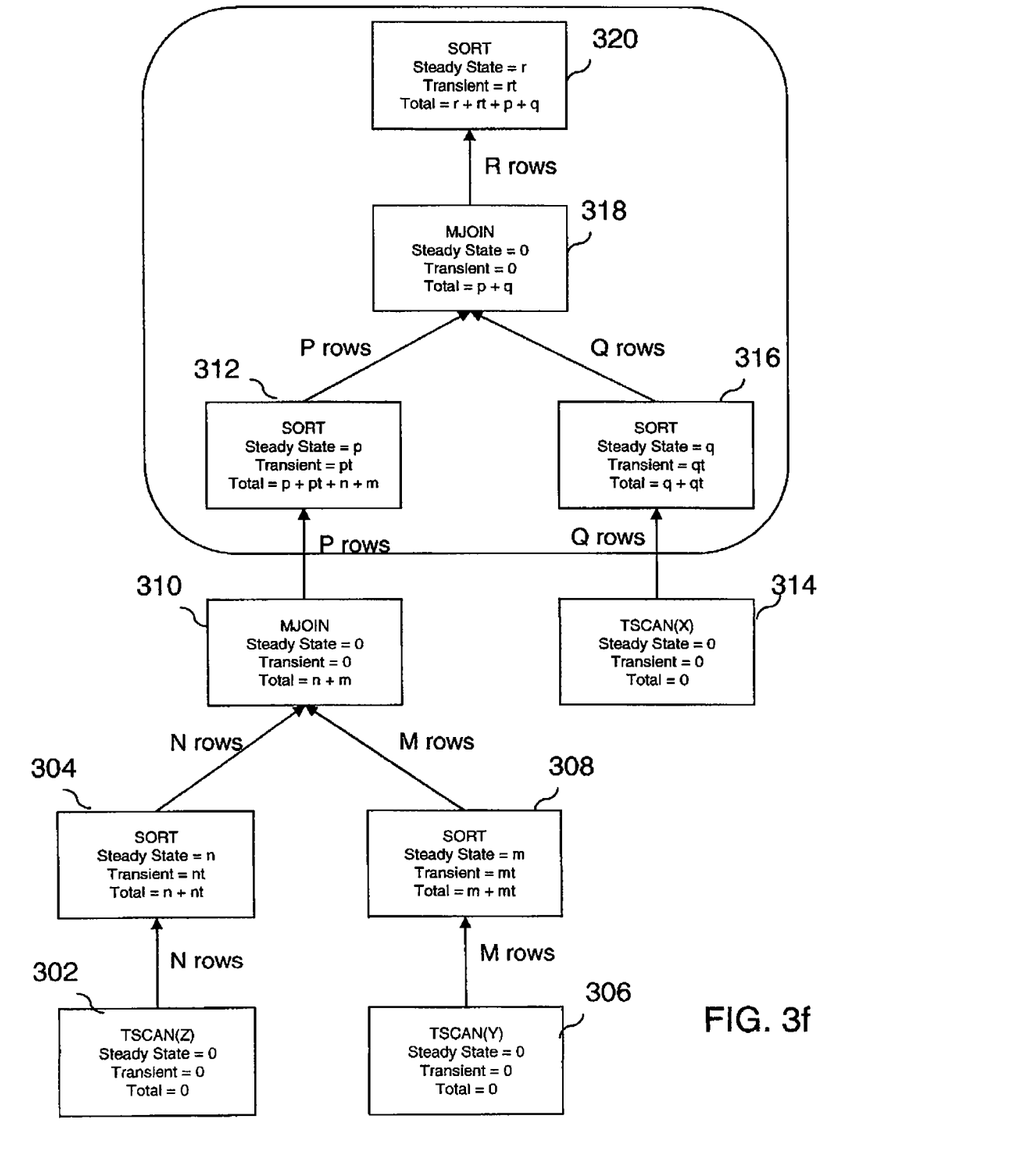

With a sort 320 on top of the merge join 318 (FIG. 3O, the nodes of interest still include the sort nodes 312 and 316. The total tempdb usage, 'r+rt+p+q', is the steady state usage of the nodes 312, 316 and the steady state and transient usage of the sort 320.

Figure 3G:
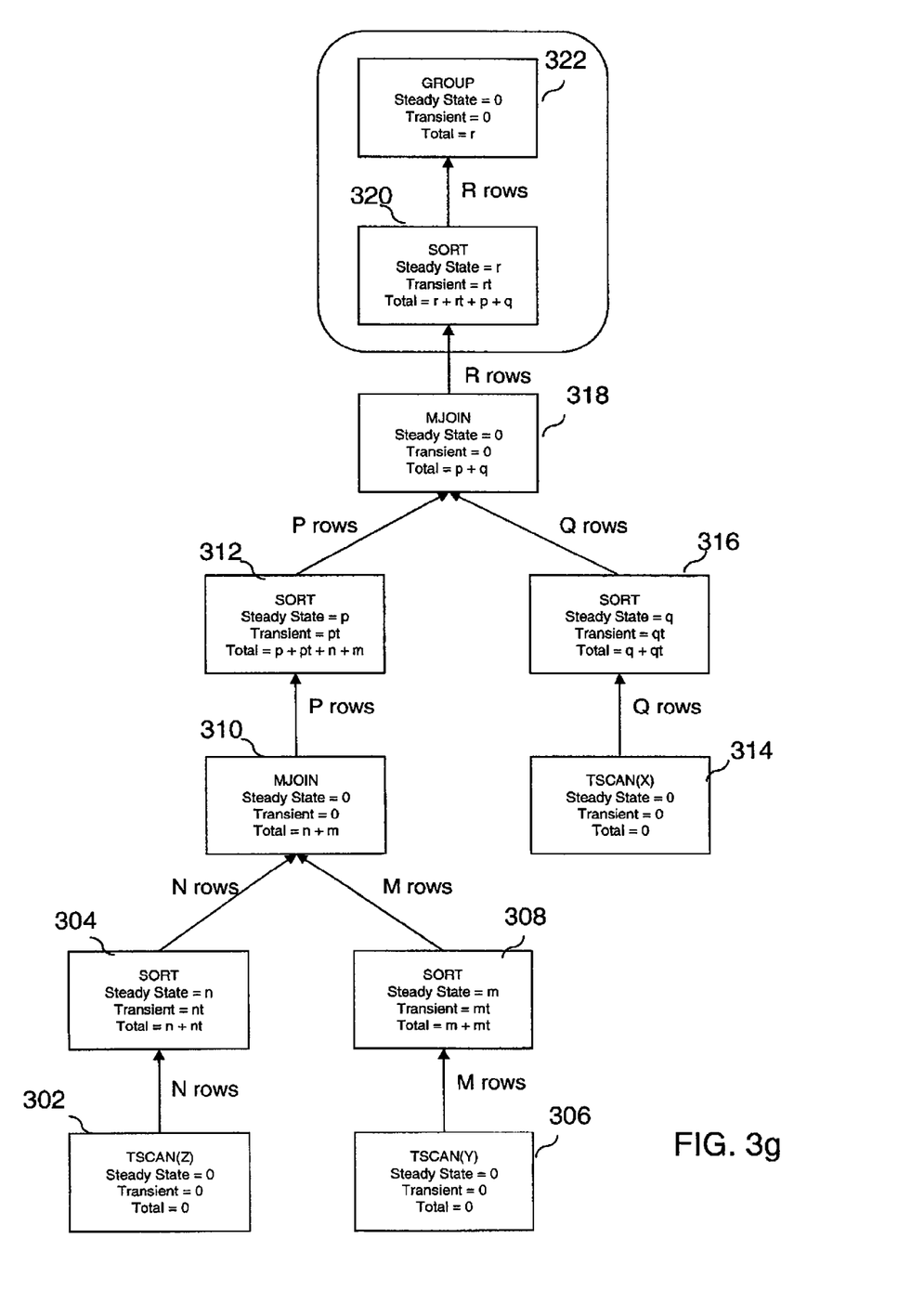

Subsequently, as shown in FIG. 3g, for a group 322 on top of the sort 320, the interesting node is the first descendent sort node 320. Thus, the total tempdb usage is the steady state usage 'r' by the sort node 320.

As shown by this example, the total tempdb usage varies throughout the life of the plan. At the root of the complete tree (block 322), the total tempdb usage determined is 'r'. If the overflow threshold were set as some amount, A, then a node which has total tempdb usage greater than A would be identified as overflow. For example, if the total usage of 'p+pt+n+m' of block 312 were greater than A, it would be marked as an overflow node. In accordance with an embodiment of the invention, this state of overflow is inherited by the parent node of a marked node and identified through to the root node, even though the total tempdb usage at the root node, 'r', may be below the threshold.

Referring back to FIG. 2, once the tempdb usage of a plan has been identified, a check is made as to whether the determined usage is identified as overflow (block 204). When there is an overflow state identified for a plan (block 204 is affirmative), it is flagged as an overflow plan (block 206) before being added to a list of plans (block 208), where the list of plans includes those that do not result in an overflow (i.e., when block 204 is negative). The process repeats while there are still plans under consideration, as checked via block 210. Once all the possible plans have been added to the plan list, a check is made to determine whether there is a plan in the list that has not been identified as an overflow plan (block 212). If there is a plan available that has not been identified as an overflow plan and thus does not overflow the threshold level for tempdb usage (block 212 is affirmative), all plans that have been identified as overflow are discarded from the plan list (block 214).

To avoid plans that overflow tempdb, in a preferred embodiment, a plan that is not marked as overflow is always chosen over a plan that is marked as overflow irrespective of the plan cost. Thus, plan selection continues by considering the tempdb usage (block 216), such that at every level of the optimization, all the viable plans compete against each other and only a few of them survive depending on the property they provide and their cost. For purposes of illustration, all the plans are presumed to have identical properties, such that the only determining factors are cost and tempdb usage parameters.

Of the remaining non-overflowing plans, those plans which are better than all of the others in either tempdb usage or cost are retained for the next level of optimization. The purpose of retaining the non-overflowing plans that use a least amount of tempdb (though they may be costly) is to improve the optimizer's capability to produce plans that are tempdb thrifty. If all the plans are overflowing (block 212 is negative), then plan selection proceeds with the cheapest plan being chosen without consideration of the tempdb usage (block 218), as is commonly understood in the art.

In this manner, the final plan produced by the above procedure is a plan which is the cheapest of those plans that uses less tempdb than allotted, if such a plan exists. If, on the other hand, all the possible plans use more tempdb than available, then the cheapest among the plans is chosen.

Figure 4:
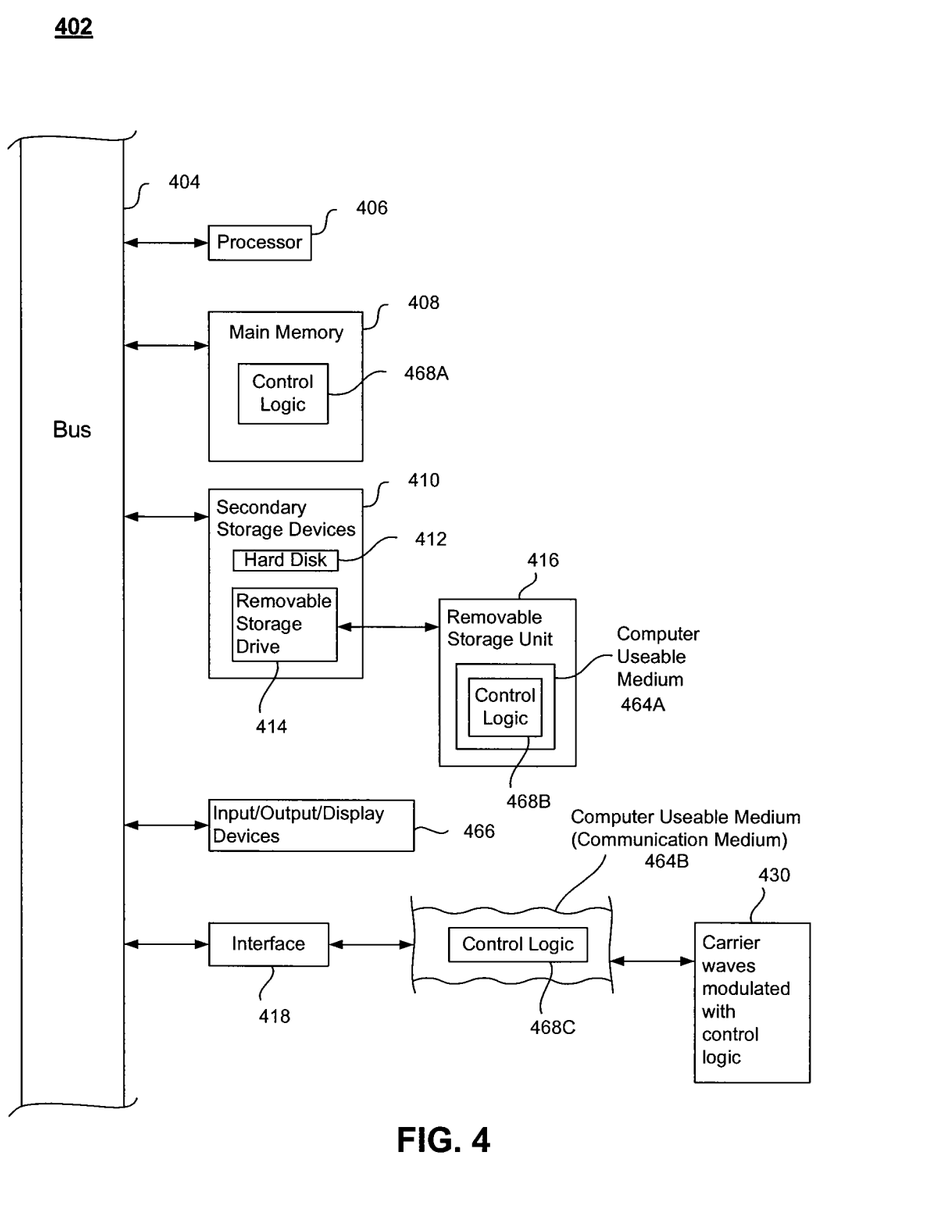
FIG. 4 illustrates an example computer useful for implementing components of embodiments of the invention.

In an embodiment of the present invention, the system and components of embodiments described herein are implemented using well known computers, such as example computer 402 shown in FIG. 4. For example, database management system 140 or server 130 can be implemented using computer(s) 402.

The computer 402 can be any commercially available and well known computer capable of performing the functions described herein, such as computers available from International Business Machines, Apple, Sun, HP, Dell, Compaq, Digital, Cray, etc.

The computer 402 includes one or more processors (also called central processing units, or CPUs), such as a processor 406. The processor 406 is connected to a communication bus 404.

The computer 402 also includes a main or primary memory 408, such as random access memory (RAM). The primary memory 408 has stored therein control logic 426A (computer software), and data.

The computer 402 also includes one or more secondary storage devices 410. The secondary storage devices 410 include, for example, a hard disk drive 412 and/or a removable storage device or drive 414, as well as other types of storage devices, such as memory cards and memory sticks. The removable storage drive 414 represents a floppy disk drive, a magnetic tape drive, a compact disk drive, an optical storage device, tape backup, etc.

The removable storage drive 414 interacts with a removable storage unit 416. The removable storage unit 416 includes a computer useable or readable storage medium 424 having stored therein computer software 428B (control logic) and/or data. Removable storage unit 416 represents a floppy disk, magnetic tape, compact disk, DVD, optical storage disk, or any other computer data storage device. The removable storage drive 414 reads from and/or writes to the removable storage unit 416 in a well known manner.

The computer 402 also includes input/output/display devices 422, such as monitors, keyboards, pointing devices, etc.

The computer 402 further includes a communication or network interface 418. The network interface 418 enables the computer 402 to communicate with remote devices. For example, the network interface 418 allows the computer 402 to communicate over communication networks or mediums 424B (representing a form of a computer useable or readable medium), such as LANs, WANs, the Internet, etc. The network interface 418 may interface with remote sites or networks via wired or wireless connections.

Control logic 428C may be transmitted to and from the computer 402 via the communication medium 424B. More particularly, the computer 402 may receive and transmit carrier waves (electromagnetic signals) modulated with control logic 430 via the communication medium 424B.

Any apparatus or manufacture comprising a computer useable or readable medium having control logic (software) stored therein is referred to herein as a computer program product or program storage device. This includes, but is not limited to, the computer 402, the main memory 408, secondary storage devices 410, the removable storage unit 416 and the carrier waves modulated with control logic 430. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for query optimization with awareness of limited resource usage, the method comprising:
    evaluating a determined maximum limited resource usage of a plurality of possible plans being considered for query execution by a query engine during execution lifetimes of the plurality of possible plans, the evaluating comprising accumulating a steady state temporary database usage of nodes utilized at a level of the plurality of possible plans and a transient temporary database usage of a top most node at the level;
    marking at least one of the plurality of plans with an overflow indication when exceeding an overflow threshold;
    determining whether at least one of the plurality of possible plans has a determined maximum limited resource usage that does not exceed the overflow threshold; and
    including the determined maximum limited resource usage as a consideration during plan selection by the query engine when at least one of the plurality of possible plans does not exceed the overflow threshold.

2. The method of claim 1, wherein the limited resource usage comprises temporary database usage.

3. The method of claim 1, further comprising proceeding with plan selection by the query engine without including the identified limited resource usage as a consideration when all possible plans exceed the threshold level.

4. The method of claim 1, wherein including further comprises discarding all plans that exceed the threshold level from possible selection when at least one possible plan does not exceed the threshold level.

5. A system for query optimization with awareness of limited resource usage, the system comprising:
    one or more processors;
    a memory coupled to the one or more processors, having instructions stored thereon that, when executed by the one or more processors, cause the one or more processor to perform operations comprising:
    evaluating a determined maximum limited resource usage of a plurality of possible plans being considered for query execution by a query engine during execution lifetimes of the plurality of possible plans, the evaluating comprising accumulating a steady state temporary database usage of nodes utilized at a level of the plurality of possible plans and a transient temporary database usage of a top most node at the level;
    marking at least one of the plurality of plans with an overflow indication when exceeding an overflow threshold;
    determining whether at least one of the plurality of possible plans has a determined maximum limited resource usage that does not exceed the overflow threshold; and
    including the determined maximum limited resource usage as a consideration during plan selection by the query engine when at least one of the plurality of possible plans does not exceed the overflow threshold.

6. The system of claim 5, wherein the limited resource usage comprises temporary database usage.

7. The system of claim 5, further comprising proceeding with plan selection by the query engine without including the identified limited resource usage as a consideration when all possible plans exceed the threshold level.

8. The system of claim 5, wherein including further comprises discarding all plans that exceed the threshold level from possible selection when at least one possible plan does not exceed the threshold level.

9. A computer program product including a non-transitory computer-readable storage medium having instructions stored thereon that, if executed by one or more processors, cause said processors to perform operations comprising:
    evaluating a determined maximum limited resource usage of a plurality of possible plans being considered for query execution by a query engine during execution lifetimes of the plurality of possible plans, the evaluating comprising accumulating a steady state temporary database usage of nodes utilized at a level of the plurality of possible plans and a transient temporary database usage of a top most node at the level;
    marking at least one of the plurality of plans with an overflow indication when exceeding an overflow threshold;
    determining whether at least one of the plurality of possible plans has a determined maximum limited resource usage that does not exceed the overflow threshold; and
    including the determined maximum limited resource usage as a consideration during plan selection by the query engine when at least one of the plurality of possible plans does not exceed the overflow threshold.

10. The computer program product of claim 9, wherein the limited resource usage comprises temporary database usage.

11. The computer program product of claim 9, the operations further comprising proceeding with plan selection by the query engine without including the identified limited resource usage as a consideration when all possible plans exceed the threshold level.

12. The computer program product of claim 9, the including further comprising discarding all plans that exceed the threshold level from possible selection when at least one possible plan does not exceed the threshold level.

* * * * *